United States Patent [19]
Stehle et al.

[11] Patent Number: 5,157,609
[45] Date of Patent: Oct. 20, 1992

[54] METHOD AND APPARATUS FOR CONTROLLING AN AUTOMATICALLY SHIFTING TRANSMISSION

[75] Inventors: Heinz Stehle, Weissach; Thomas Wehr, Ditzingen; Joseph Petersmann, Wimsheim; Willi Seidel, Eberdingen-Hochdorf; Ludwig Hamm, Sindelfingen; Thomas Foeldi, Stuttgart; Udo Judaschke, Herne; Gerhard Eschrich; Ronald Schwamm, both of Gerlingen; Wolfgang Runge, Ravensburg; Wolf-Dieter Gruhle, Tettnang; Peter Wendel, Kressbronn, all of Fed. Rep. of Germany

[73] Assignees: Dr. Ing. h.c.F. Porsche Aktiengesellschaft; Robert Bosch GmbH; Zahnradfabrik Friedrichshafen AG, all of Fed. Rep. of Germany

[21] Appl. No.: 548,253

[22] Filed: Jul. 5, 1990

[30] Foreign Application Priority Data

Jul. 5, 1989 [DE] Fed. Rep. of Germany ....... 3922051

[51] Int. Cl.$^5$ .............................................. B60K 41/06
[52] U.S. Cl. .................................... 364/424.1; 74/866
[58] Field of Search ...................... 364/424.1; 74/866

[56] References Cited

U.S. PATENT DOCUMENTS

| | | | |
|---|---|---|---|
| 4,338,666 | 7/1982 | Suzuki et al. | 74/866 x |
| 4,501,171 | 2/1985 | Müller et al. | 74/866 |
| 4,593,582 | 6/1986 | Sawada et al. | 364/424.1 X |
| 4,669,334 | 6/1987 | Miyamura et al. | 364/424.1 X |
| 4,692,866 | 9/1987 | Kosuge | 364/424.1 |
| 4,742,733 | 3/1988 | Schreiner | 74/866 |
| 4,793,217 | 12/1988 | Morisawa et al. | 74/866 |
| 4,841,815 | 6/1989 | Takahashi | 74/866 |
| 4,843,916 | 7/1989 | Bouta | 74/866 |
| 4,889,015 | 12/1989 | Kundo | 74/866 |
| 4,897,790 | 1/1990 | Bieber | 364/424.1 |
| 5,025,684 | 6/1991 | Shehle et al. | 74/866 x |
| 5,035,160 | 7/1991 | Morita | 364/424.1 X |
| 5,065,328 | 11/1991 | Abo et al. | 364/424.1 X |
| 5,076,116 | 12/1991 | Sasaki | 74/866 |

FOREIGN PATENT DOCUMENTS

| | | |
|---|---|---|
| 0038083 | 10/1981 | European Pat. Off. . |
| 0144608 | 6/1985 | European Pat. Off. . |
| 0194799 | 9/1986 | European Pat. Off. . |
| 0304089 | 2/1989 | European Pat. Off. . |
| 0391387 | 10/1990 | European Pat. Off. . |
| 8500512 | 4/1986 | Fed. Rep. of Germany ........ 74/866 |
| 3615961 | 12/1986 | Fed. Rep. of Germany . |
| 8800713 | 2/1989 | Fed. Rep. of Germany . |
| 1081824 | 4/1986 | Japan . |
| 1238748 | 9/1989 | Japan . |
| 2102086 | 1/1983 | United Kingdom . |

OTHER PUBLICATIONS

"Application of the HHP 22 Four-Speed Automatic Transmission with Electronic/Hydraulic Control", Lorenz et al., ATZ Automobiltechnische Zeitschrift 85, Jun. 1983, pp. 401–405.

SAE Technical Paper Series, Porsche Carrera Two Tiphonic Transmission, Josef Petersmann, Willi Seidel, and Wenrer Möllers, Passenger Car Meeting and Exposition, Dearborn, Mi., Sep. 17–20, 1990, pages—2 cover pages and pp. 11–24.

*Primary Examiner*—Parshotam S. Lall
*Assistant Examiner*—Thomas S. Auchterlonie
*Attorney, Agent, or Firm*—Evenson, Wands, Edwards, Lenahan & McKeown

[57] ABSTRACT

In order to adapt the shifting characteristics of an electrohydraulically controlled, automatically shifting transmission continuously to the dirver's driving style or to a just existing or real time traffic situation, the driving speed (v), the lateral acceleration (aq), the longitudinal acceleration (alb), the longitudinal deceleration (alv) and the engine rotational speed (nmot) in addition to the throttle valve position alpha, are detected and by way of characteristic diagrams and a linking function are added to form a parameter from which, by filtering, a driving activity is determined. This driving activity is finally used for the selection of a shifting program from a plurality of shifting programs ranging from a consumption-optimized shifting program (SKF1) to a power-optimized shifting program (SKF5).

65 Claims, 12 Drawing Sheets

CHARACTERISTIC DIAGRAM FOR SELECTING SHIFT PROGRAM AS A FUNCTION OF DRIVING ACTIVITY

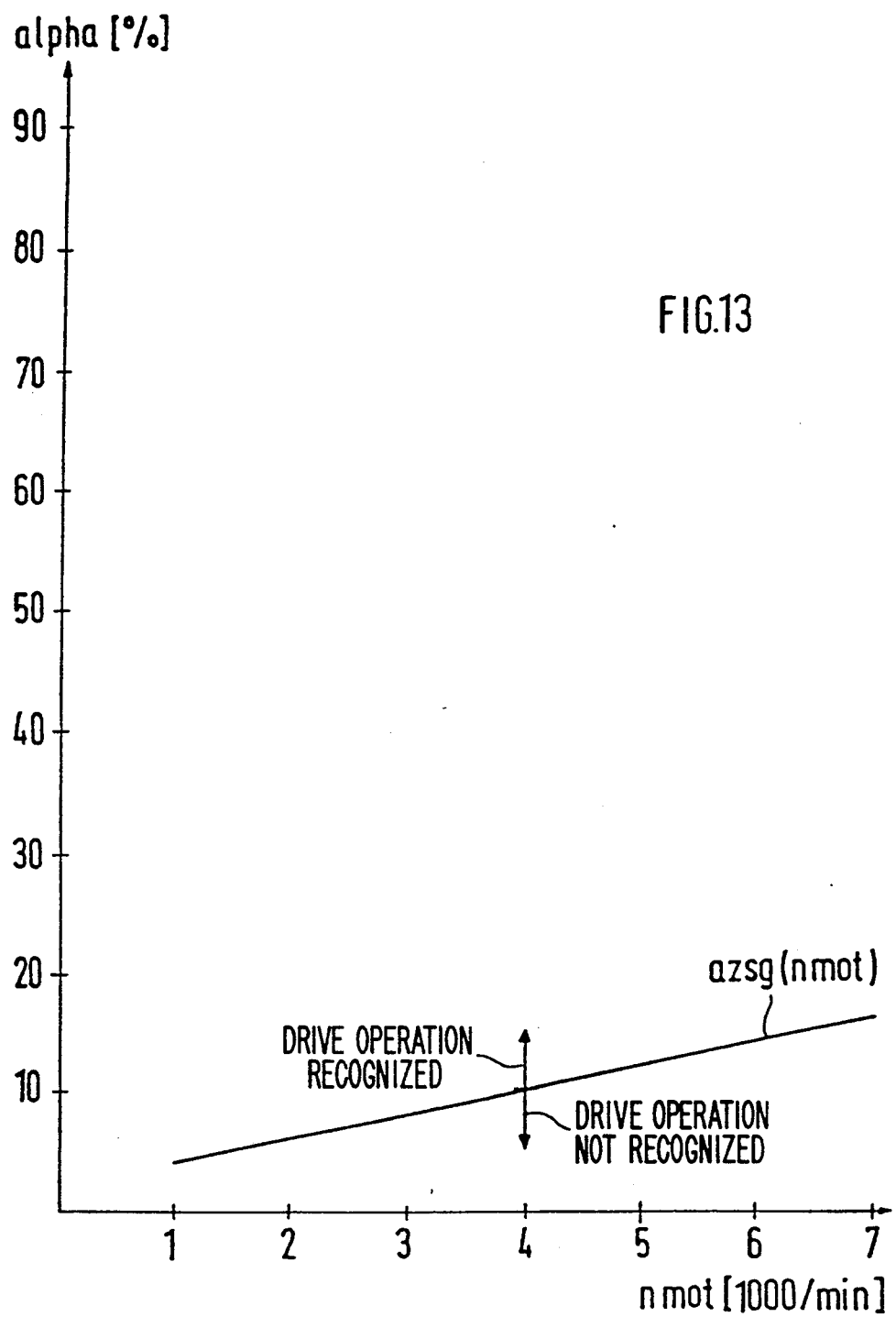

METHOD AND APPARATUS FOR CONTROLLING AN AUTOMATICALLY SHIFTING TRANSMISSION

CROSS-REFERENCE TO RELATED APPLICATIONS

Applicants hereby cross-reference to a related Ser. No. 07/548,254, filed based upon German application Serial No. P 339 22 040.0, filed Jul. 7, 1989, the subject matter of which is incorporated herein by reference.

BACKGROUND AND SUMMARY OF THE INVENTION

The present invention relates to a method and apparatus for controlling an automatically shifting transmission and, more particularly, to such a method an apparatus which simulates a driver's driving style and assures delivery of the demanded driving power from a consumption-oriented driving style to a power-oriented style.

Normally an automatic transmission control system is configured either to permit a method of driving that is as economical as possible or one that is as power-oriented as possible. Because of the characteristics of the Otto cycle engine, it is not possible to meet both criteria simultaneously. Frequently, a compromise therefore has to be made between both extremes since a purely consumption-oriented shifting program does not offer sufficient safety reserves in critical traffic situations, and the fuel consumption is too high in the case of a power-oriented shifting program.

Another possibility is a manual change-over between an "economy program" and a "power program", (*Automobiltechnische Zeitschrift*, Volume 6/1983, pp. 401-405). In this case, the driver must first actuate a change-over switch before the corresponding shifting program is made available. Two alternative extremes are now offered to the driver which, however, permit either only a method of driving that is consumption-oriented or one that is power-oriented.

It is also known from the DE-PS 33 41 652 to automate this manual change-over. To this end, an accelerator pedal signal which is proportional to the position of the accelerator pedal is sensed and stored. By virtue of the sensed accelerator pedal signal value, accelerator pedal signal values which were detected and stored earlier are continuously updated, and an accelerator pedal activity is calculated from the stored accelerator pedal signals which evaluates a driver's driving style or a driving situation. This accelerator pedal activity will then be used for influencing limit values of shifting decisions in such a manner that the transition from the consumption-optimized to the power-optimized shifting program takes place continuously.

It is therefore possible to simulate the driver's driving style by way of this control system by detecting a quantity which is representative of this driving style. It was found, however, that in certain driving situations, for example, on routes with many bends, the driving style or a driving situation cannot be simulated by this system to a desirable extent.

It is therefore an object of the present invention to provide a method and apparatus for controlling an automatically shifting transmission that avoids the above-mentioned disadvantages.

This object has been achieved in accordance with the present invention by providing a method and apparatus which, in addition to a sensed throttle valve signal value, senses at least one additional cyclically and/or non-cyclically sensed operating parameter of the motor vehicle.

Principal advantages of the present invention are that a method and apparatus for the control of an automatically shifting transmission are provided which, based on a shifting program that is as consumption-optimal as possible, dynamically adapts itself to vehicle handling and the just-existing or real time driving or traffic situation without the requirement of actuating additional operating elements. These advantages have been achieved through only a slightly higher expenditure of operating or driving parameters to be detected by sensors so that an already existing transmission control device for an electrohydraulic transmission, such as model 4HP22 of ZF Co., can be used as part of the present invention without any major expenditures. In addition to only a single additional sensor, only a change of the control method is this required.

As a result, a drive of a motor vehicle which is equipped with the apparatus and control system of the present invention for the automatically shifting transmission which operates according to the method of the present invention is always ensured of receiving the respective driving power which it demands, in which case, care is taken that the fuel consumption is always as low as possible in all ranges.

BRIEF DESCRIPTION OF THE DRAWINGS

These and other objects, features and advantages will become more readily apparent from the following detailed description when taken in conjunction with the accompanying drawings wherein:

FIG. 13 is a limit line $azsg(nmot)$ for the recognition of a coasting/drive operation.

DETAILED DESCRIPTION OF THE DRAWINGS

Figure 1:
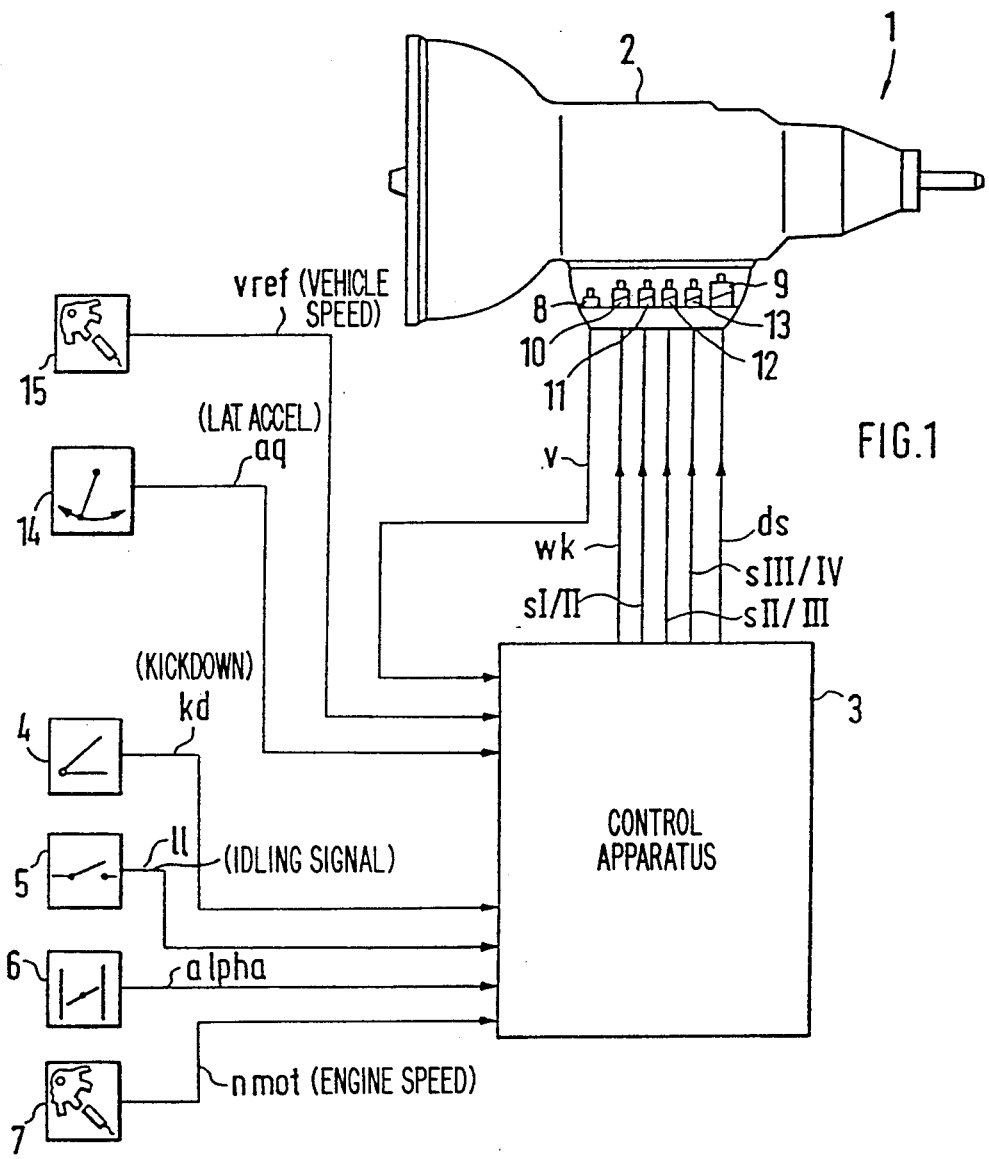
FIG. 1 is a block diagram of an electrohydraulic control system in accordance with the present invention for an automatically shifting transmission of a motor vehicle.

FIG. 1 shows an electrohydraulic control system designated generally by the numeral 1 of an automatically shifting motor vehicle transmission 2 as described, for example, in Bosch's *"Technische Berichte"*, 7 (1983) 4 at pp. 160–166 and in the previously-mentioned *ATZ* 85 (1983) 6, at pp. 401–405.

A control apparatus 3 controls regulators and valves as a function of a kick-down signal (kd) of a kick-down generator 4 at the motor vehicle accelerator pedal, of an idling signal 11 of a throttle switch 5, of a throttle valve angle signal (alpha) of a throttle valve angle generator 6, and of an engine rotational speed signal (nmot) of an engine rotational speed generator 7 of an internal-combustion engine (now shown) and of a driving speed signal (v) (in practice, a transmission output rotational speed signal) of a transmission output rotational speed generator 8. In particular, the control apparatus 3 controls a pressure regulator 9 for a hydraulic fluid (signal output (ds)); a first solenoid valve 10 for controlling a converter or a converter lockup clutch (signal output (wk)); a second solenoid valve 11 for controlling a gear step change between gear steps I and II (signal output (Si/II)); a third solenoid valve 12 for controlling a gear step change between gear steps II and III (signal output (sII/III)); and a fourth solenoid valve 13 for controlling the gear step change between gear steps III/IV (signal output (sIII/IV)).

Control can be influenced by the vehicle driver through a conventional selector level (not shown) for the preselection of driving positions P, R, N, D, 3, 2, 1. As a result, driving positions P (Park), R (reverse gear step), N (neutral gear step), D (automatic shifting of all four gears IV, III, II, I), 3 (automatic shifting of the three lower gear steps III, II, I) and 2 (automatic shifting of gear steps II and I) and 1 (setting the first gear step I) can be used. In the case of the above-described transmission, a program selector switch is also provided by virtue of which at least two shifting programs (SKF$_j$) can be manually selected according to which the four gear steps in gear D are shifted.

This manual selection of the shifting programs is automated so that the transmission control adapts itself automatically to a driver's driving style or to a just existing, i.e., immediate, driving situation. A transmission control of this type is known, for example, from DE 33 41 652 C2. There, a quantity which simulates the driving style is generated by the sensing of the accelerator pedal or of the throttle valve angle. It was found, however, that is some driving situations this control does not sufficiently simulate the driving style. The transmission control system 1 is therefore expanded by a lateral acceleration generator 14, which generates a lateral acceleration signal (aq), and by a speed generator 15 which senses a speed (vref) at a nonpowered axle of the vehicle.

Figure 2:
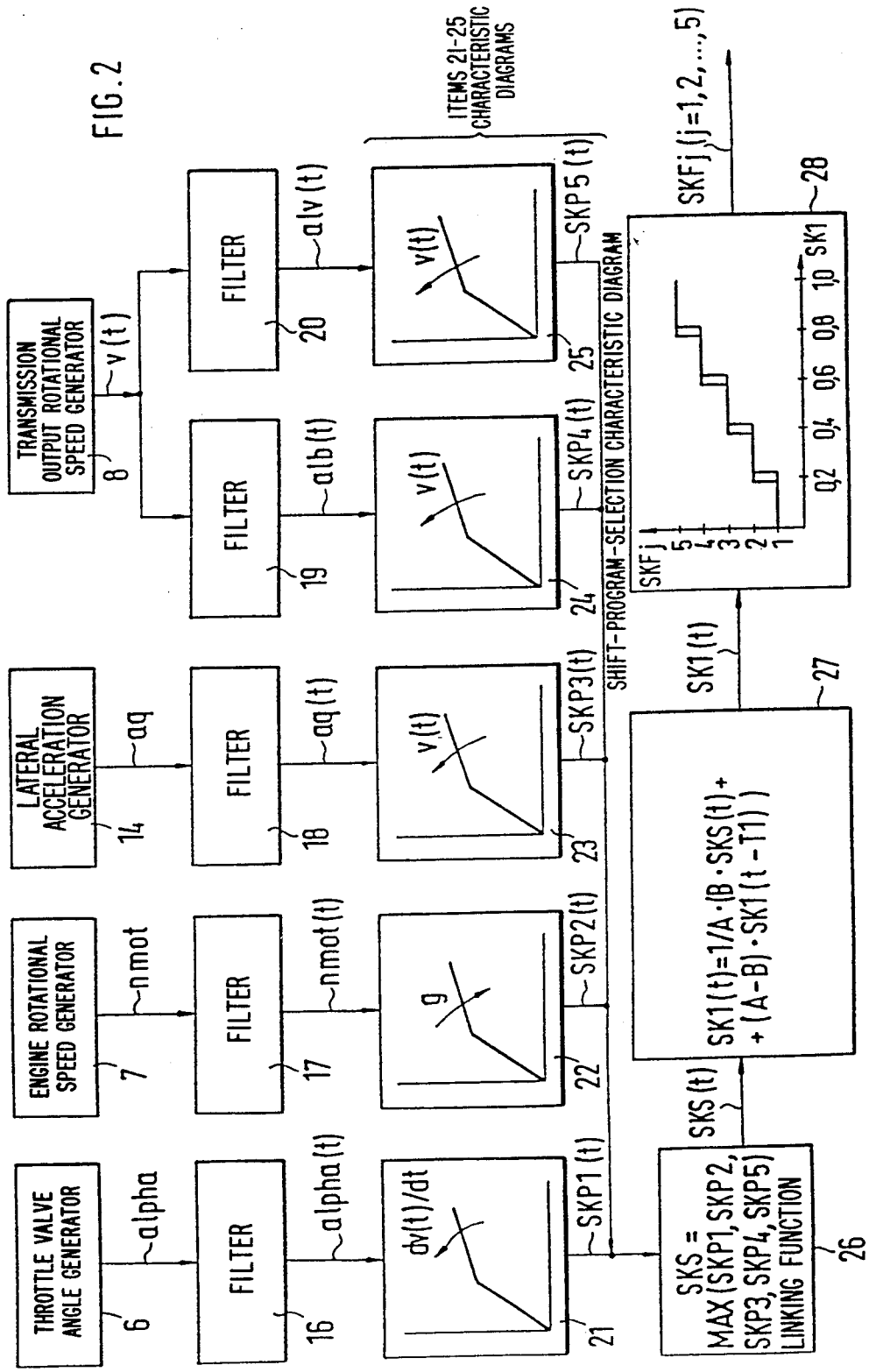
FIG. 2 is a block diagram for determining a driving activity or a shifting program.

Therefore, corresponding to FIG. 2, a determination of a driving activity SK1(t) is derived from at least one additional cyclically and/or noncyclically sensed operating or driving parameter of the motor vehicle, such as the engine rotational speed (nmot), the lateral acceleration (aq) and/or the driving speed (v). By sensing and preferably digital filtering (according to a PT1-algorithm) with filters 16, 17 and 18, respectively, a throttle valve signal value (alpha(t)), an engine rotational speed signal value (nmot(t)) and a lateral acceleration signal value (aq(t)) are determined.

From the driving speed (v) determined by the transmission output rotational speed generator 8, by forming difference quotients and subsequent digital filtering (also according to a PT1-algorithm), a longitudinal acceleration signal value (alb(t)), which corresponds to the derivation of the driving speed after the time dv(t)/dt for dv(t)/dt>0, and a longitudinal deceleration signal value (alv(t)), which corresponds to the time-related derivation of the driving speed dv(t)/dt for dv(t)/dt<0, is determined by filters 19 and 20, respectively.

The sensing of the throttle valve angle (alpha) takes place every 30 milliseconds, while the engine rotational speed (nmot), the vehicle lateral acceleration (aq), and the driving speed (v) are sensed every 40 milliseconds. A new value of the longitudinal acceleration and of the longitudinal deceleration is derived from this repeated sensing every 100 milliseconds. In the case of the throttle valve angle (alpha) and of the vehicle lateral acceleration (aq), it may be useful to determine the digital filtering by different rising and falling times. In such case, the rise is preferably weighted higher than the fall.

In a first characteristic diagram 21, a first primary parameter SKP1(t)=f(alpha(t), dv/dt) is generated from the throttle valve signal value (alpha(t)) by way of characteristic lines depending on the time-related derivation of the driving speed dv(t)/dt, and in a second characteristic diagram 22, a second primary parameter SKP2(t)=f(nmot(t), g) is generated, by way of characteristic lines depending on the gear step (g), from the engine rotational speed signal value (nmot(t)).

A third characteristic diagram 23 derives a third primary parameter SKP3(t)=f(aq(t), v(t)) by way of curves depending on the driving speed signal value (v(t)). From the longitudinal acceleration signal value (alb(t)), a fourth primary parameter (SKP4(t)=f(alb(t), v(t)) is derived by a fourth characteristic diagram 24 from characteristic lines depending on the driving speed signal value (v(t)). Finally, a fifth characteristic diagram 25 generates a fifth primary parameter (SKP5(t)=f(alv(t), v(t)) by characteristic lines depending on the driving speed signal value v(t). The respective second influencing variable for characteristic diagrams 21 to 25, for reasons of clarity, is shown only symbolically.

From these five primary parameters SKP1(t) to SKP5(t), a secondary parameter SKS(t) is obtained by way of a linking function 26 and is stored. The linking function 26 is preferably constructed as a maximum value selection from the five primary parameters (SKS(t)=MAX(SKP1, SKP2, SKP3, SKP4, SKP5).

From this secondary parameter SKS(t), a first driving activity SK1(t) is generated by a digital filter algorithm 27 with a PT1-behavior in that the newly obtained value of the secondary parameter SKS(t) and a value of a first driving activity SK1(t-T1) which was previously determined during a first calculating period (T1) and was stored are added together to form a weighted sum: SK1(t)=(1/A)*(B*SKS(t)+(A-B)*SK1(t-T1). In this case, the two weighting factors A and B may be selected for increasing values of the secondary parameter SKS(t) at A=100 and B=4, and for decreasing secondary parameters SKS(t) at A=100 and B=2. In this case, the calculating period (T1) preferably is one second.

It is, of course, also possible to use, instead of the digital filter algorithm 27, an algorithm where the values of the secondary parameters SKS(t) are stored and by means of each newly obtained value of the secondary parameter SKS(t), a number (m+1) of previously obtained and stored values of this parameter are updated, in which case, from (m+1) stored values of the secondary parameter SKS(t-iDT), i=0, 1, 2 . . ., m, by weighting and sum formation, a first driving activity SK1(t) is determined: SK1(t)=SK1'(t)=(1/ΣAi)*-Σ(Ai*SKS(t-IDT)); i=0, 1, . . . , m, in which case DT is the calculating period or a sensing interval.

With increasingly larger values of i, the weighting factors Ai become increasingly smaller. This ensures that the actual values are weighted higher than the previously stored ones.

Figure 3:
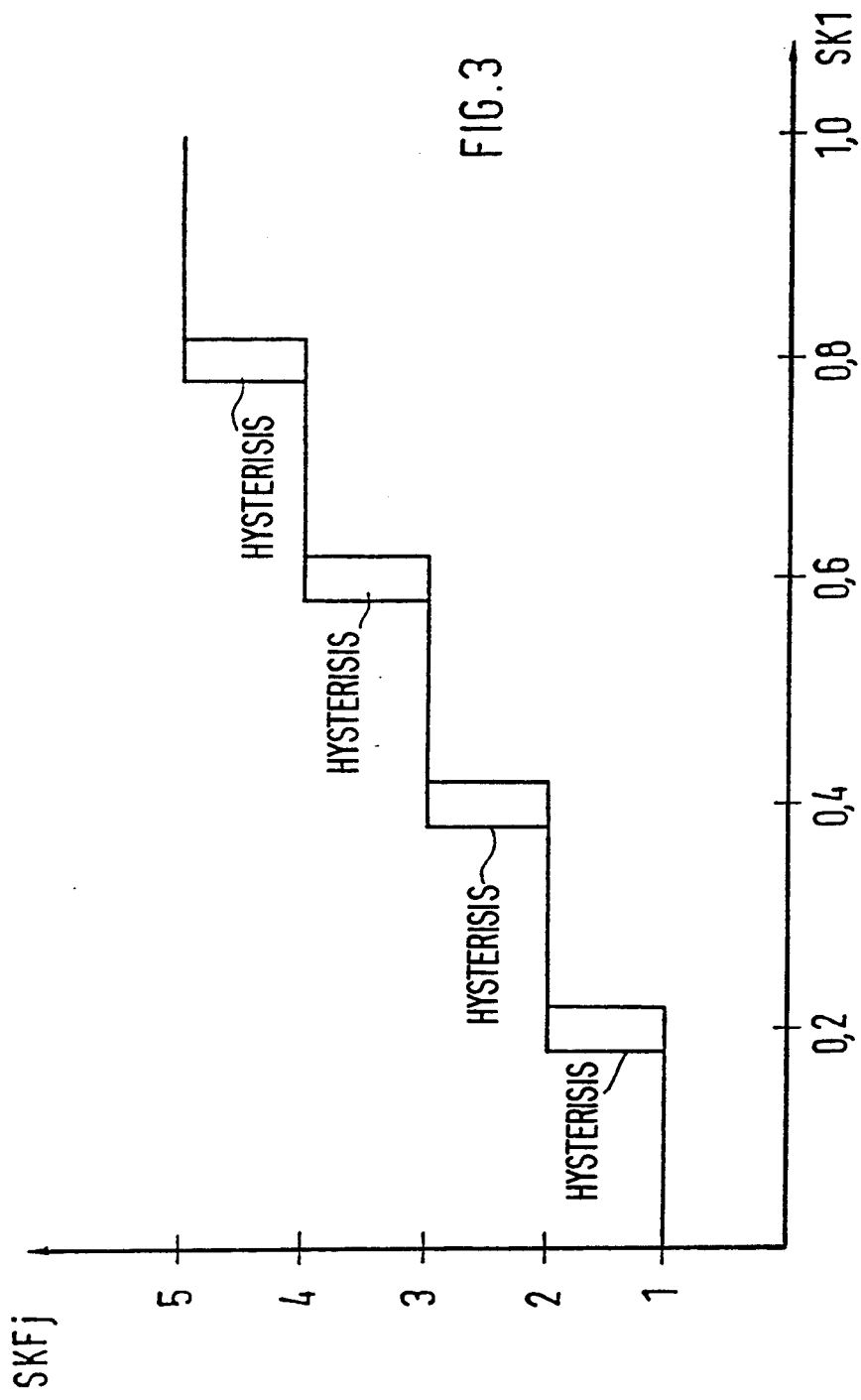
FIG. 3 is a characteristic diagram for determining a shifting program from a first driving activity.

The first driving activity SK1(t) may now be used for the selection of the shifting programs SKFj or for the targeted changing of shifting decisions. This takes place by way of a sixth characteristic diagram 28 which selects for the value of the driving activity SK1 (t) which is between 0 and 1, a shifting program (characteristic shifting diagram SKFj=F (alpha, nmot), j=1, 2, ..., 5) from a number of shifting programs SKFj ranging between a consumption-oriented shifting program SKF1 and a power-optimized shifting program SKF5 in such a manner that, with increasing values of the driving activity SK1(t), more power-optimized shifting programs are selected. In this case, the sixth characteristic diagram SKFj=f(SK1(t) has a hysteresis in order to avoid a constant shifting back and forth between the shifting programs in the case of small changes around a stationary value of SK1(t). The sixth characteristic diagram is enlarged in FIG. 3. The width of the shifting hysteresis is approximately ±0.02.

Figure 4:
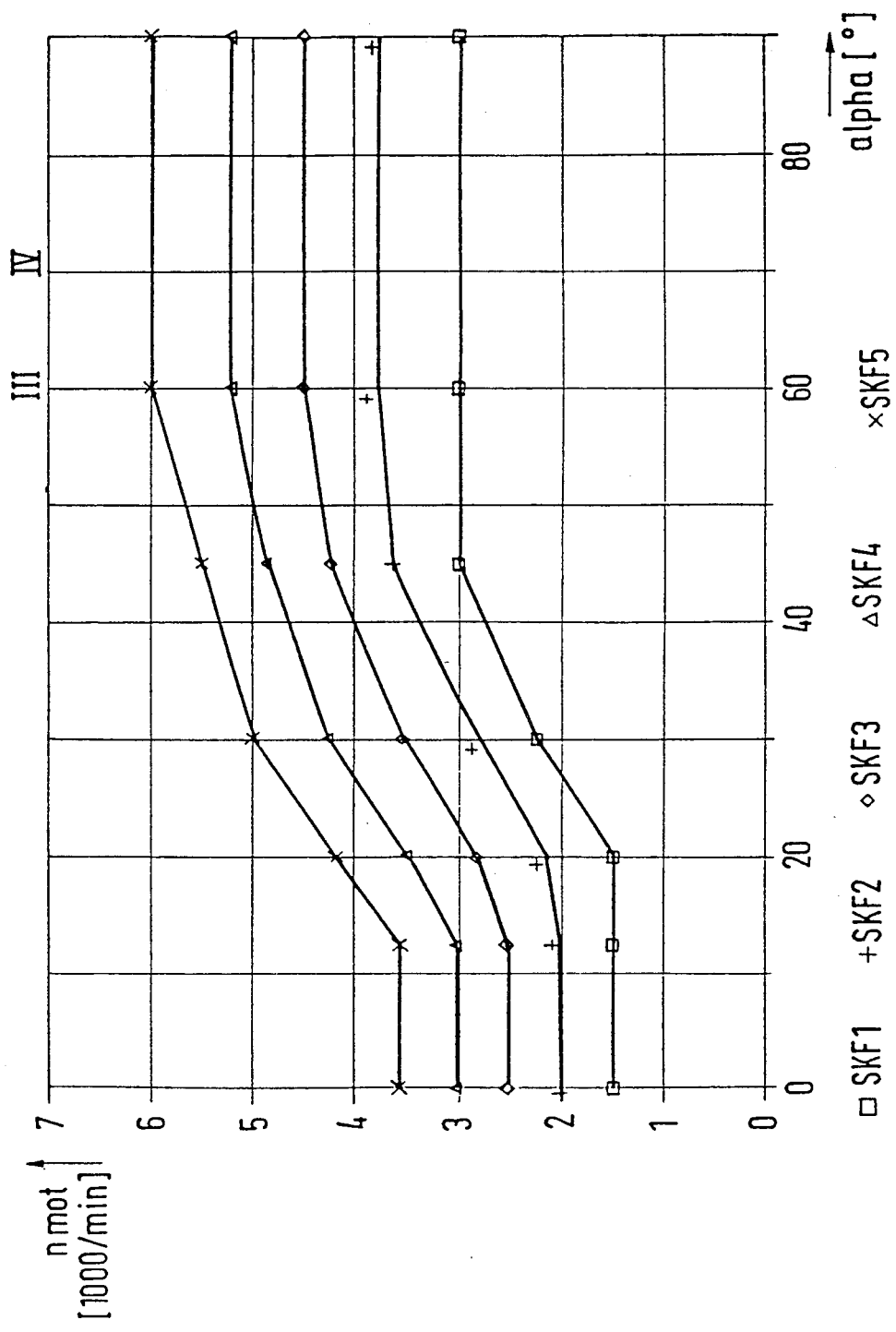
FIG. 4 is a representation of upshift lines corresponding to the shifting programs according to FIG. 3.
Figure 5:
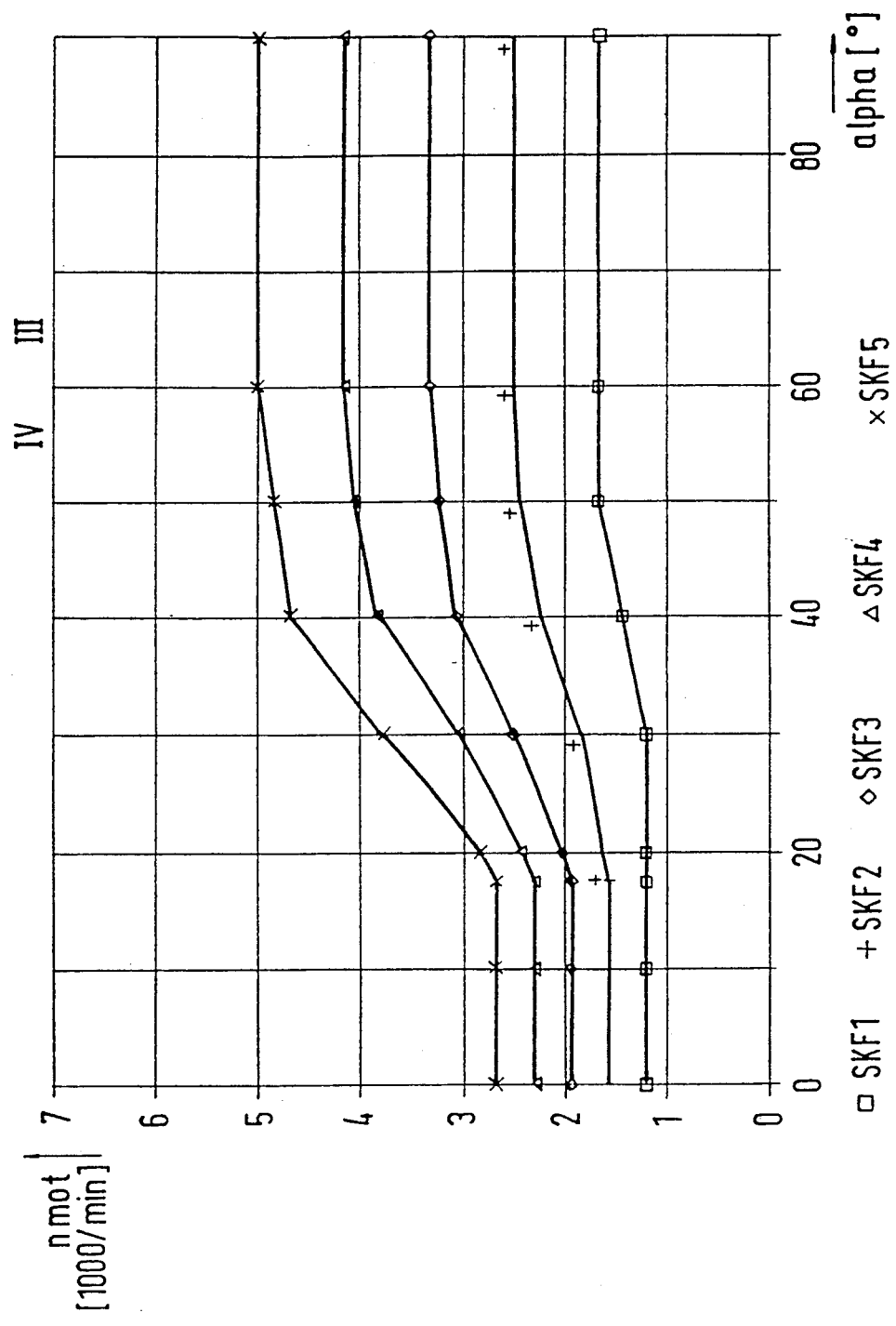
FIG. 5 is a representation of return shift lines corresponding to the shifting programs according to FIG. 3.

Shifting programs of this type (characteristic shifting diagrams according to which the gear steps (g) are shifted corresponding to the throttle valve angle (alpha) and the engine rotational speed (nmot)) are shown in FIG. 4 in the form of upshift lines from the third gear g=III to the fourth gear g=IV and in FIG. 5 in the form of downshift lines from the fourth gear g-IV to the third gear g=III, in which case the shifting lines are taken from the corresponding shifting programs or characteristic shifting diagrams SKF1 to SKF5.

Figure 6:
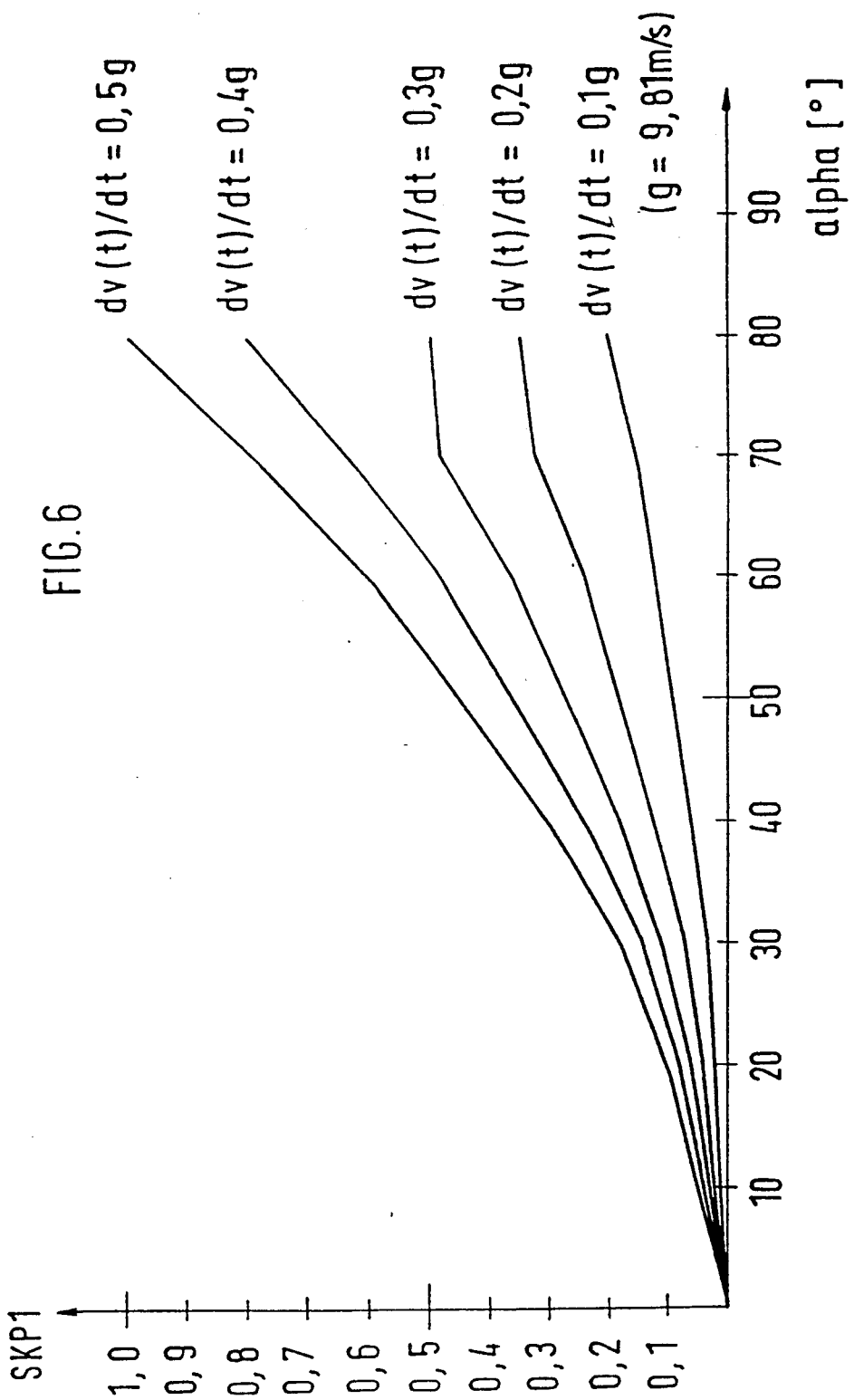
FIG. 6 is a first characteristic diagram for determining a first primary parameter.

FIG. 6 shows the first characteristic diagram SKP1(t)=f(alpha(t), dv(t)/dt) designated by 21 in FIG. 2. This first characteristic diagram SKP1, by way of rising lines, assigns larger values of the first primary parameter SKP1 to values of the throttle valve signal value (alpha(t)) which increase by way of rising curves. The rise of the curves (f(alpha(t))) depends on the time variation of the driving speed signal value (dv(t)/dt), in which case, with an increasing time variation of the driving speed signal values (dv(t)/dt), the rise increases. As a result, particularly in the case of a stead-state method of driving, an undesirable change of the just selected characteristic shifting diagram is avoided.

It is also possible to determine the value of the first primary parameter SKP1 (t), instead of from the characteristic diagram f(alpha, dv(t)/dt), by way of a single characteristic line f(alpha(t)) and to weight it with a weighting factor which increases progressively with the time variation of the driving speed signal values (dv(t)/dt).

Figure 7:
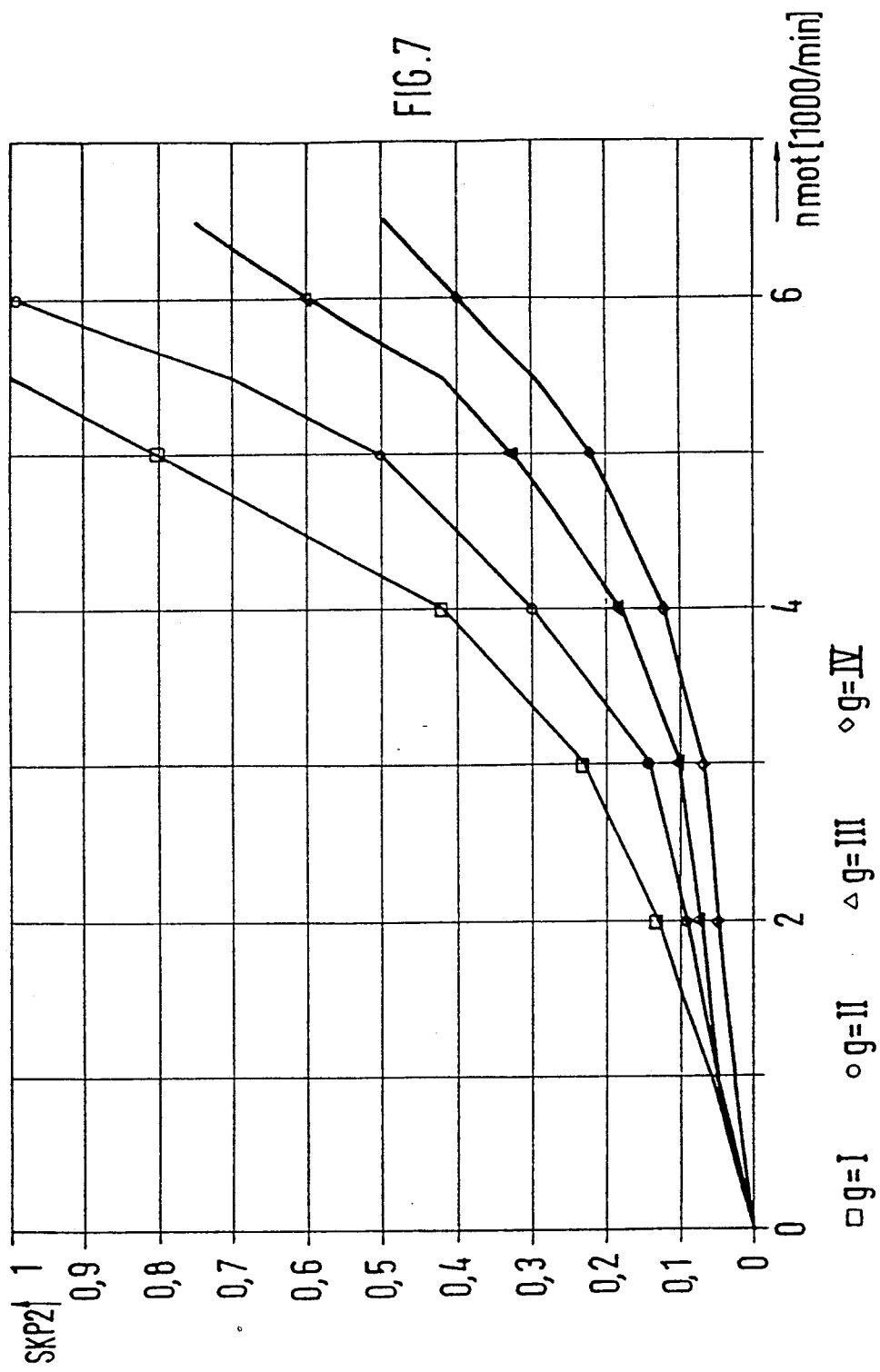
FIG. 7 is a second characteristic diagram for determining a second primary parameter.

The second characteristic diagram SKP2=f(nmot(t),g) designated by 22 shown in FIG. 2 and in greater detail in FIG. 7 assigns larger values of the second primary parameter SKP2(t) to values of the engine rotational speed signal value (nmot(t)) which increase as rising curves. In this case, the rise of the curves f(nmot(t)) is a function of the gear steps and decreases when the gear step g increases. As a result, higher rotational speeds in lower gear steps have a higher weighting than in higher gear steps. For example, nmot=4,000/min., in the first or second gear steps g=I, g=II indicate a more power-oriented driving method than the same engine rotational speed when the fourth gear step g=IV is engaged.

Figure 8:
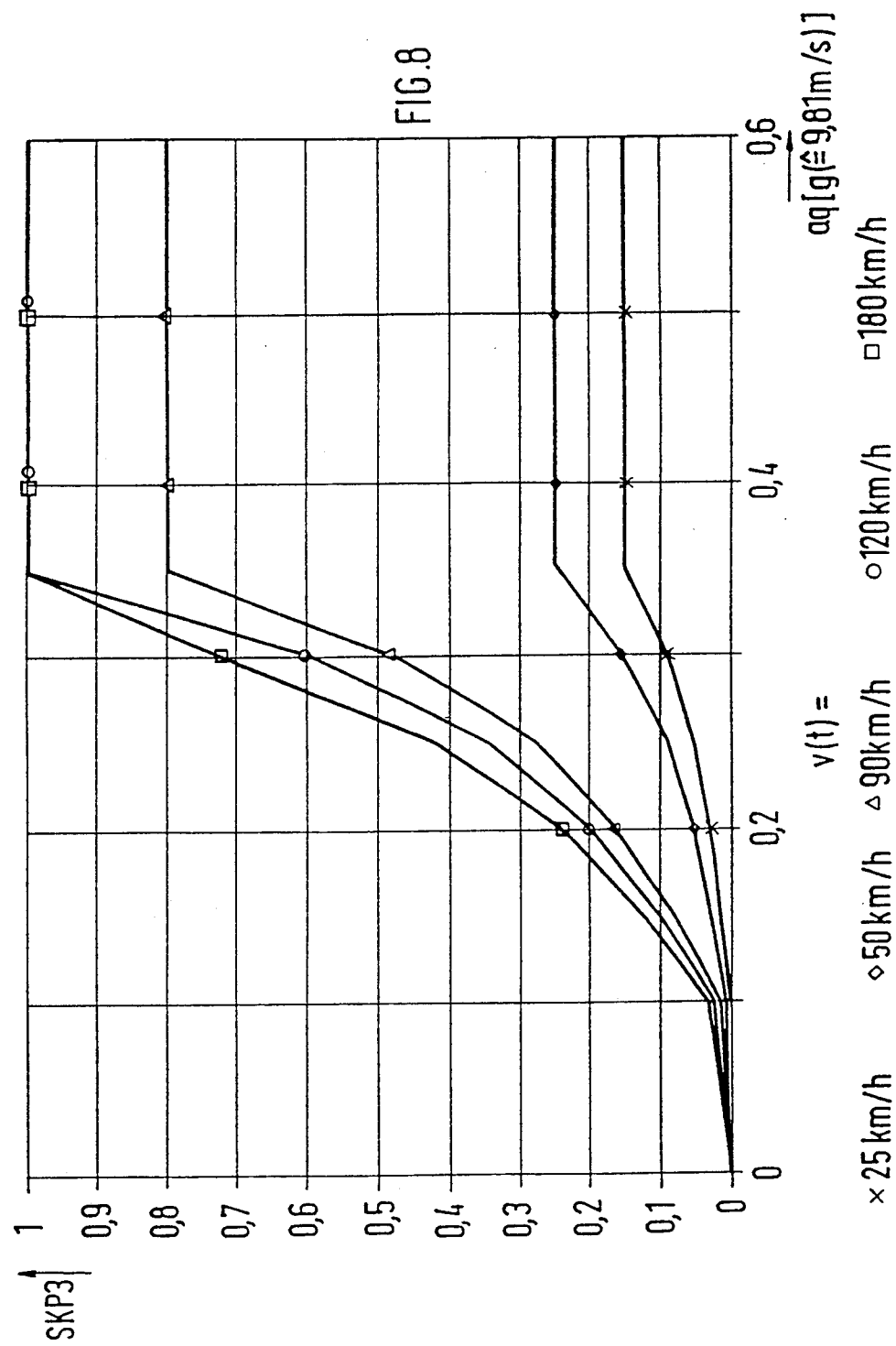
FIG. 8 is a third characteristic diagram for determining a third primary parameter.

Corresponding to FIG. 8, the third characteristic diagram SKP3=f(aq(t)), designated by 23 in FIG. 2, assigns larger values of the third primary parameter SKP3(t) to values of the lateral acceleration signal value aq(t) which increase by way of rising curves. In this case, the rise of the curves f(aq(t)) is a function of the speed and increases with rising driving speed signal values v(t). As a result, a selection of excessively power-oriented shifting programs is avoided in city traffic. Among other things, the extent of the vehicle acceleration is felt to be higher at higher speeds.

Figure 9:
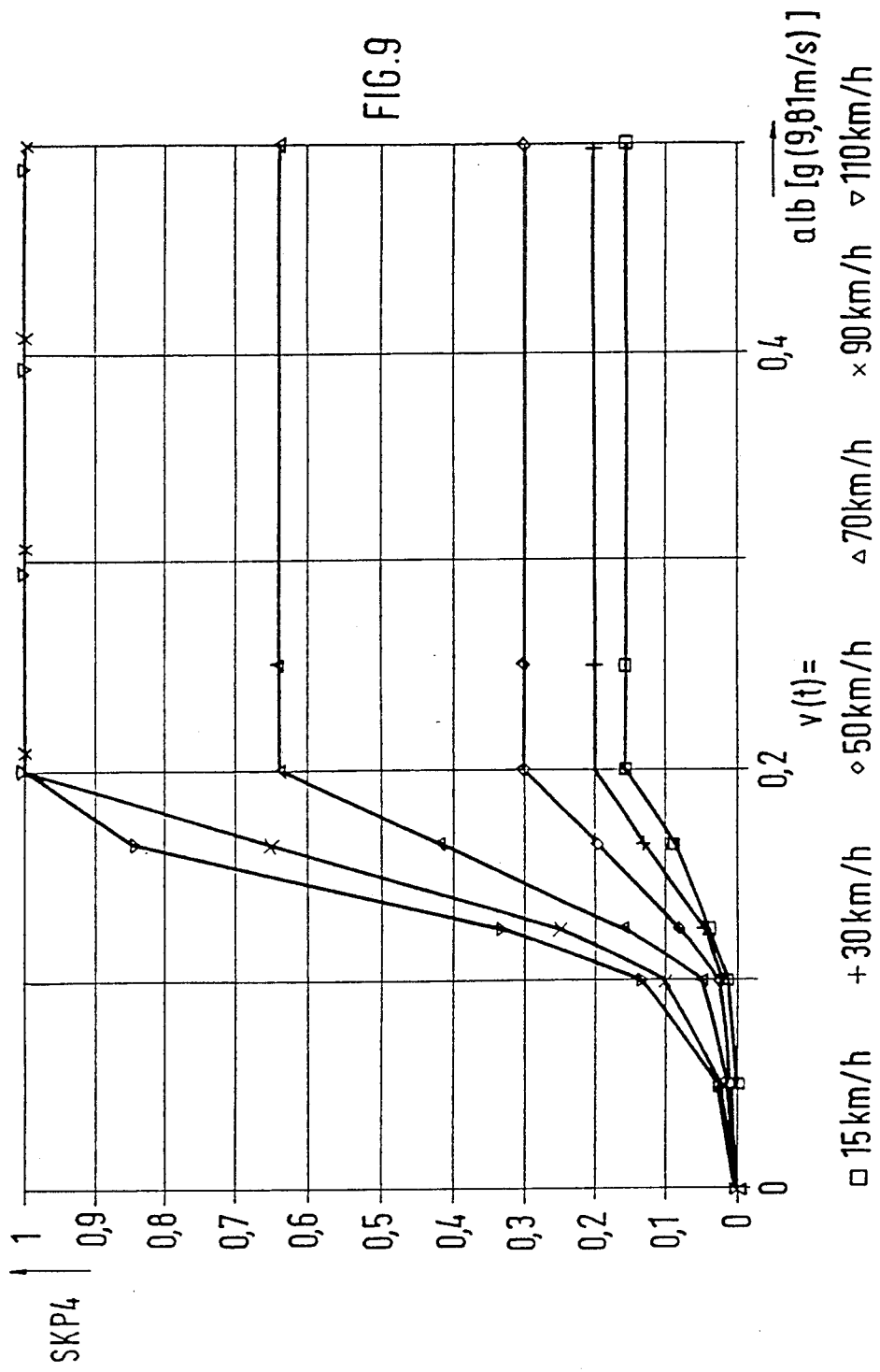
FIG. 9 is a fourth characteristic diagram for determining a fourth primary parameter.

The fourth characteristic diagram SKP4=f(alb(t), designated by 24 on FIG. 2 and, shown in greater detail in FIG. 9 assigns larger values of the fourth primary parameter SKP4(t) to values of the longitudinal acceleration signal value alb(t) which increase as rising curves. Also in this case, the rise of the increasing curves is evaluated as a function of the speed and increases with rising driving speed signal values v(t). As a result, a selection of excessively power-oriented shifting programs is avoided, and the different acceleration behavior of vehicles is taken into account.

Figure 10:
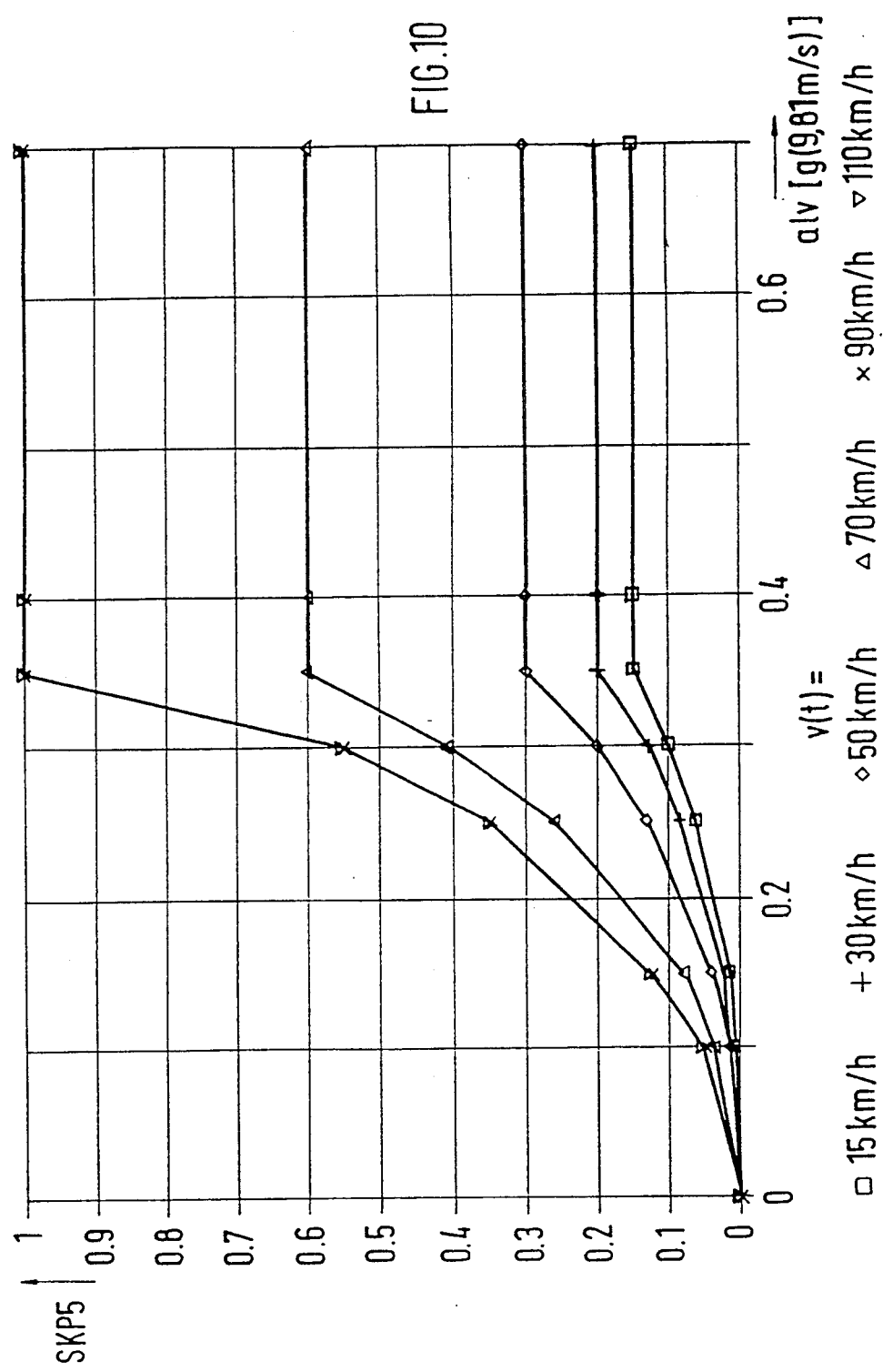
FIG. 10 is a fifth characteristic diagram for determining a fifth primary parameter.

The fifth characteristic diagram SKP5=f(alv(t), v(t)), designated by 25 and, shown in greater detail in FIG. 10 assigns larger values of the fifth primary parameter SKP5(t) to values of the longitudinal deceleration signal value alv(t) which increase as rising curves. The increase of the rising curves is again a function of the speed and increases with rising driving speed signal values v(t).

So that a motor vehicle driver in critical traffic situations immediately has available the full capacity of his motor vehicle, it can also be provided that the power-optimized shifting program (SKS5) be selected if the time variation of the throttle valve signal value (dalpha(t)/dt) is higher than a first throttle valve speed limit value (alphag1). In this case, a return takes place to the previously selected shifting program if the throttle valve signal value (alpha(t)) is set back by a fixed value (alphag) which is variable with the driving activity SK(t), SK1(t), SK2(t) and a fixed part (fak) of the reached maximal throttle valve signal value (alpha(t)-≦ =afg+(fak*alpha(t−T1). In this case, the selection of the power-optimized shifting program (SKF5) may also take place in steps.

In the case of a transmission equipped with a converter lockup clutch, it may also be advantageous for the converter lockup clutch, with increasing values of the driving activity (SK(t), SK1(t), SK2(t)), to be locked later after shifting operations and to be opened earlier before shifting operations or to be kept locked only a higher engine rotational speed signal values, such as nmot=3,400/min at SKF5 in comparison to nmot=1,000/min at SKF1.

If the transmission control system also has a kickdown shifting program (SKFKD), this shifting program (SKFKD) can be selected when the accelerator pedal is completely stepped down alpha=alphamax and can remain activated until the throttle valve signal value (alpha(t) falls below a fixed second limit value (alphag2) or a second limit value (alphag2) which is variable with the driving activity (SK(t), SK1(t), SK2(t)). In this case, as the driving activity increases, this limit value (alphag2) may be shifted toward lower values.

Finally, the selection of the shifting program (characteristic shifting diagram $SKFj = f(\text{alpha, nmot})$, $j = 1, 2, \ldots, 5$) by way of the sixth characteristic diagram $SKFj = f(Sk(t))$ may also take place on the basis of an overall driving activity SK(t) composed of the first driving activity SK1(t) and a second driving activity SK2(t) in that these two driving activities are added together by way of a weighted sum $SK(t) = (A1*SK1(t) + A2*SK2(t))/(A1+A2)$. In this case, the second driving activity SK2(t) is determined from a weighted sum $SK2(t) = (1/A)*(B*SKZ(t) + (A-B)*SK2(t-T1))$ of a newly obtained intermediate quantity SKZ(t) and a value of the second driving activity SKZ(t−T1) that was previously determined during a first calculating period T1 and stored. The intermediate quantity SKZ(t) is determined from the weighted sum $SKZ(t) = (\text{alb}(t)/\text{albmax}(g) + \text{alv}(t)/\text{alvmax}(g) + \text{aq}(t)/\text{aqmax})/3$ of a quotient of the longitudinal acceleration signal value (alb(t)) and a gear-dependent maximal vehicle acceleration (albmax(g)); of a quotient of a longitudinal deceleration signal value (alv(t)) and a gear-dependent maximal vehicle deceleration (alvmax(g)), and the lateral acceleration signal value (aq(t)) divided by a maximal vehicle lateral acceleration (aqmax).

Finally, it will be useful in the case of a first determination of the values of the first and the second driving activity SK1(t), SK2(t) and in the case of a new start (initialization) of a program corresponding to the method, to set the values SK1(t−T1), SK2(t−T1) to an initial value for a transmission control implemented by a microprocessor.

In addition to influencing the shifting programs by the driving activity SK1, SK2, it may also be useful to introduce additional criteria for the reduction of shifting which, in turn, may also be a function of the driving activity SK1, SK2. Thus, it is particularly desirable that an upshifting of the transmission be avoided when the vehicle, for example, approaches a turn in the road and the driver's foot leaves the accelerator pedal.

It was found in this case that such a recognition of bends can take place by sensing the time variation of the throttle valve signal value dalpha/dt. The reason is that, as a rule, a driver takes back the accelerator pedal, and therefore also the throttle valve faster in front of a bend than he would under normal circumstances in order to, for example, reduce the driving speed.

An upshifting carried out by conventional transmission control systems when the accelerator pedal is released, in this case, is delayed by a second time period (T2) if a speed of change (dalpha/dt) of the throttle valve signal value (alpha(t)) falls below a third limit value (alphag3), in which case, the second time period (T2) may be a function of the driving activity SK1(t), SK2(t).

This second time period (T2) is also set to zero during a braking operation of the motor vehicle, and after the termination of the braking operation, an upshifting is delayed by a third time period (T3) which depends on the driving activity. Thus, it is achieved that also during and immediately after a braking operation no shifting takes place.

Figure 11:
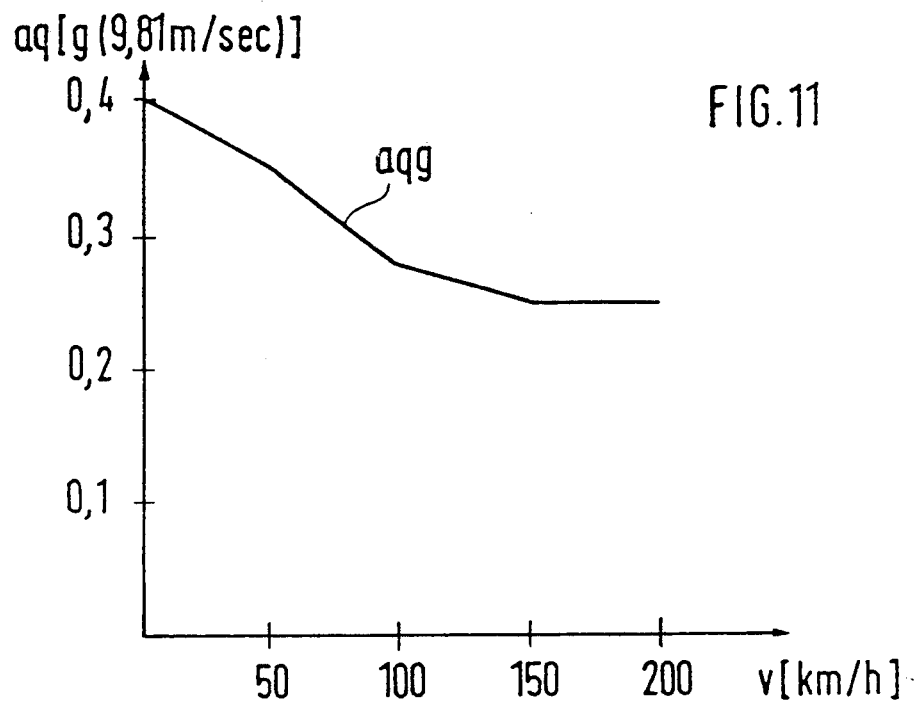
FIG. 11 is a limit line $aqg = f(v)$ above which gear step changes are avoided.

Also, a gear step change is avoided and/or the time periods (T2, T3) are set to zero if the amount of the lateral acceleration signal value |aq| exceeds a limit line $\text{aqg} = f(v(t))$ which depends on the driving speed (v(t)) and/or is variable with the driving activity SK(t), SK1(t), SK2(t), as shown, for example, in FIG. 11.

Likewise, the gear step change is avoided as long as, after falling below the limit line $\text{aqg} = f(v(t))$, a fourth period of time (T4) has not yet elapsed which is fixed or is variable with the driving activity. As a result, unnecessary load changes are avoided during fast cornering which, under certain circumstances, may result in unstable vehicle conditions.

Figure 12:
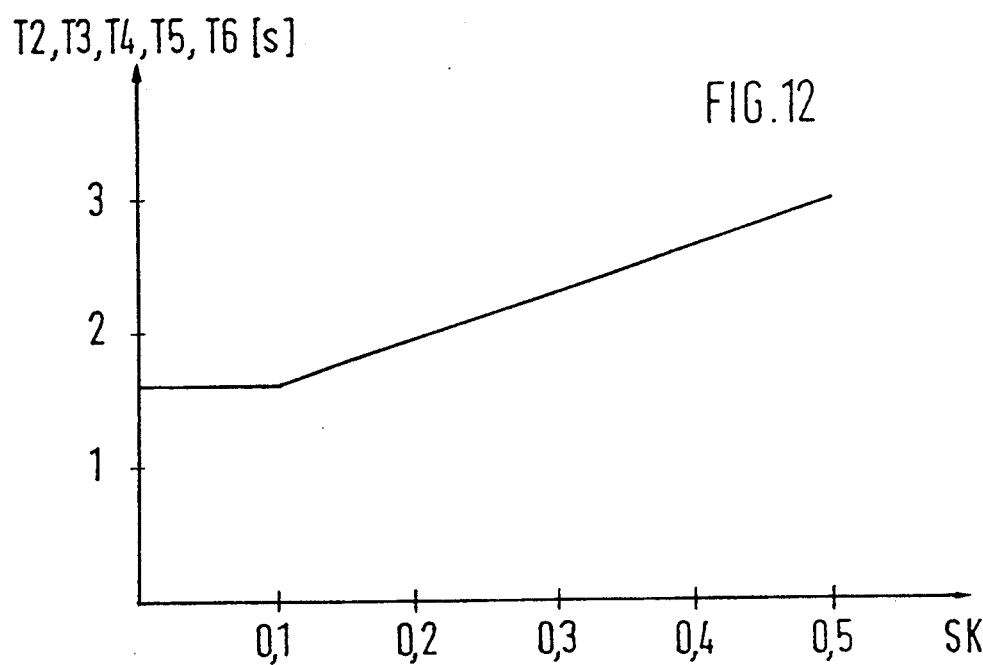
FIG. 12 is a characteristic line which shows a dependence of time periods $T2, T3, T4, T5$ and $T6$ on a driving activity $SK(t)$.

A dependence of time periods (T2, T3, T4) and a time period (T5), hereinafter described, on the driving activity SK(t), SK1(t), SK2(t) is shown in FIG. 12. These time periods preferably increase with rising values of the driving activity and are, for example, between 1.6 s and 3 s.

The present invention can also provide delay of an upshifting after the expiration of time periods (T2, T3 and T4) by another fifth time period (T5) depending on the driving activity as long as the engine is not yet back in the drive operation, and the time variation of the driving speed signal value (dv(t)/dt) has not yet assumed any positive values, for example, in order to give the driver some time after cornering or braking (without the occurrence of an upshifting), until he accelerates again. The drive operation is recognized if the throttle value signal value (alpha(t)) is larger than a characteristic limit line $\text{azsg} = f(\text{nmot})$, shown in FIG. 13, which is dependent on the engine rotational speed, and the time variation of the vehicle speed (dv(t)/dt) takes on positive values.

As a superordinated function for avoiding unstable driving conditions, such as excessive slip at the powered axle, it may be provided that these possibilities for preventing an upshifting be permitted only if a differential speed ($Dv = \text{vref} - v$, $Dv(t) = \text{vref}(t) - v(t)$) between a speed (vref, vref(t)) of a nonpowered axle and the driving speed (v(t)) detected at the powered axle (measured by the transmission output rotational speed) does not exceed a permissible differential speed value (Dvzul). In this case, the slip at the powered axle is simulated by the differential speed (Dv).

Supplemental measures which can be taken when the permissible differential speed value (Dvzul) is exceeded include opening of a converter lockup clutch of a transmission equipped with a torque converter; setting of a hold time (T6) during which an upshifting cannot be prevented; the increasing of an engaged gear step g by one; and preventing backshifts, in which case these functions are set back again when the drive operation is recognized as previously mentioned.

According to a further embodiment of the invention, a prevention of upshifting can be permitted only if the lateral acceleration signal value (aq(t)) is larger than a second lateral acceleration limit value (aqg2); the time variation of the throttle valve signal value (dalpha(t)/dt) is larger than a fourth throttle valve speed limit value (alphag4); and the throttle valve signal value (alpha(t)) is smaller than a specific percentage of the engine-rotational-speed-dependent characteristic limit line (azsg(nmot)) shown in FIG. 13. As a result, the vehicle cannot turn in during cornering in the case of a sudden load change.

The values for the parameters utilized in the drawings and in the specification are only standard or representative values. The method itself may also be implemented by a discretely constructed control system as well as by a microprocessor. In the case of a discretely constructed control system, the individual method steps and the elements shown in the block diagrams are to be constructed as modules, whereas, in a microprocessor implementation, they are implemented as programs or program parts. The parallel determination of the primary parameters SKP1, SKP2, ..., SKP5 shown in FIG. 2 must then occur sequentially.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for controlling an automatically shifted transmission of a motor vehicle equipped with an internal combustion engine which is controllable by a power control element, configured as one of an accelerator pedal and a throttle valve, in which gear steps of said transmission are shifted automatically by one of at least two selectable shifting programs according to a function of at least sensed position of said throttle valve and of sensed engine rotational speed, comprising the steps of:
   (a) one of cyclically and non-cyclically sampling and storing values of said throttle valve position,
   (b) one of cyclically and non-cyclically sampling and storing values of said driving speed,
   (c) sensing lateral acceleration of said motor vehicle,
   (d) one of cyclically and non-cyclically sampling and storing values of said lateral acceleration,
   (e) sensing longitudinal acceleration of said motor vehicle,
   (f) one of cyclically and non-cyclically sampling and storing values of said longitudinal acceleration,
   (g) sensing longitudinal deceleration of said motor vehicle,
   (h) one of cyclically and non-cyclically sampling and storing values of said longitudinal deceleration,
   (i) one of cyclically and on-cyclically sampling and storing values of said engine rotational speed,
   (j) assigning a first primary parameter value to said values of said throttle valve position by a first characteristic diagram,
   (k) assigning a second primary parameter value to said values of said engine rotational speed by a second characteristic diagram,
   (l) assigning a third primary parameter value to said values of said lateral acceleration by a third characteristic diagram,
   (m) assigning a fourth primary parameter value to said values of said longitudinal acceleration by a fourth characteristic diagram,
   (n) assigning a fifth primary parameter value to said values of said longitudinal deceleration by a fifth characteristic diagram,
   (o) linking said first, second, third, fourth and fifth primary parameter values to a secondary parameter value by a linking function,
   (p) determining and storing a first driving activity to obtain a change-over strategy for one of selecting one of said selectable shifting programs and of a targeted changing of shifting decisions, whereby said first driving activity is determined by a weighted sum of said secondary parameter value and the value of said first driving activity determined at a time constituted by one earlier first calculating period.

2. The method according to claim 1, wherein the step of selection of the shifting program from the first driving activity occurs, with a sixth characteristic diagram, from a number of shifting programs including a consumption-optimized shifting program and a power-optimized shifting program, wherein additional power-optimized shifting programs are selected with increasing values of the first driving activity.

3. The method according to claim 2, wherein the sixth characteristic diagram has a hysteresis.

4. The method according to claim 2, wherein the power-optimized shifting program is selected if the time variation of the throttle valve signal value is larger than a second throttle valve speed limit value, and a return takes place to the previously selected shifting program if the throttle valve signal value is taken back by a fixed value of a value which is variable with the driving activity and a fixed part of the achieved maximal throttle valve signal value.

5. The method according to claim 2, wherein, if a speed of change of the throttle valve signal value exceeds a first limit value which is one of fixed and variable with the driving activity, at least one next higher, more power-oriented shifting program is selected at least until the power-optimized shifting program is reached.

6. The method according to claim 1, further including the step of setting an evaluation factor for said secondary parameter value when rising to a higher value than for said secondary parameter valve when falling.

7. The method according to claim 6, wherein the step of selection of the shifting program from the first driving activity occurs with a sixth characteristic diagram, from a number of shifting programs including a consumption-optimized shifting program and a power-optimized shifting program, wherein additional power-optimized shifting programs are selected with increasing values of the first driving activity.

8. The method according to claim 7, wherein the sixth characteristic diagram has a hysteresis.

9. The method according to claim 8, wherein a first characteristic diagram of the five characteristic diagram assigns larger values of the first primary parameter to values of the throttle valve signal value which increase by a rising curve.

10. The method according to claim 9, wherein the rise of the curve is a function of a time variation of a signal value of a sensed driving speed and increases with an increasing time variation of the driving speed signal values.

11. The method according to claim 9, wherein values of the curve are weighted with a weighting factor which increases progressively with the time variation of a signal value of a sensed driving speed.

12. The method according to claim 1, wherein the linking function is a maximal value selection from the primary parameters.

13. The method according to claim 1, wherein a first characteristic diagram of the five characteristic diagram assigns larger values of the first primary parameter to values of the throttle valve signal value which increase by a rising curve.

14. The method according to claim 13, wherein the rise of the curve is a function of a time variation of a signal value of a sensed driving speed and increases with an increasing time variation of the driving speed signal values.

15. The method according to claim 13, wherein values of the curve are weighted with a weighting factory which increases progressively with the time variation of a signal value of a sensed driving speed.

16. The method according to claim 1, wherein a second characteristic diagram of the five characteristic curves assigns larger values of the second primary parameter value to values of the engine rotational speed signal value which increase by a rising curve.

17. The method according to claim 16, wherein the rise of the curve is a function of the gear step and decreases with an increasing gear step.

18. The method according to claim 1, wherein a third characteristic diagram of the five characteristic diagrams assigns larger values of the third primary parameter value to values of the lateral acceleration signal value which increase by a rising curve.

19. The method according to claim 18, wherein the rise of the curve is a function of the speed and increases with increasing signal values of a sensed driving speed.

20. The method according to claim 1, wherein a fourth characteristic diagram of the five characteristic diagram assigns larger values of the fourth primary parameter value to values of the longitudinal acceleration signal value which increase by a rising curve.

21. The method according to claim 20, wherein the rise of the rising curve is a function of the speed and increases with increasing signal values of a sensed driving speed.

22. The method according to claim 1, wherein a fifth characteristic diagram of the five characteristic diagrams assigns larger values of the fifth primary parameter value to values of the longitudinal deceleration signal value which increase by a rising curve.

23. The method according to claim 22, wherein the rise of the rising curve is a function of the speed and increases with increasing signal values of sensed driving speed.

24. The method according to claim 1, wherein the selection of the shifting program takes place by way of the sixth characteristic diagram from an overall driving activity composed of the first driving activity and of a second driving activity.

25. The method according to claim 24, wherein the second driving activity is determined from a weighted sum of a newly obtained intermediate quantity and a value of a second driving activity previously determined in a first calculating period and stored.

26. The method according to claim 25, wherein the intermediate quantity is determined from a weighted sum of a quotient of a longitudinal acceleration signal value and a maximal vehicle acceleration which is a function of the gear, of a quotient of a longitudinal deceleration signal value and of a maximal vehicle deceleration which is a function of the gear, and the lateral acceleration signal value divided by a maximal vehicle lateral acceleration.

27. The method according to claim 25, wherein in a first determination of the values of the first and the second driving activity, the values are set to an initial value.

28. The method according to claim 1, further including the steps of locking later after shifting operation and opening earlier before shifting operative a converter lockup clutch of a transmission equipped with a torque converter with increasing values of the driving activity, after shifting operations, and opening the clutch earlier or holding the clutch locked only at higher engine rotational speed signal values.

29. The method according to claim 1, further including the step when the accelerator pedal is stepped down completely, of selecting and actuating a kick-down shifting program until the throttle valve signal value falls below a second limit value which is one of fixed and variable with the driving activity.

30. The method according to claim 29, wherein an upshift during the drive operation is delayed by a second time period if a speed of change of the throttle valve signal value falls below a third limit value, the second time period depending on said first driving activity.

31. The method according to claim 30, wherein the second time period is set to zero during a braking operation of the motor vehicle, and after the termination of the braking operation, an upshifting during the drive operation is delayed by a third time period depending on said first driving activity.

32. The method according to claim 31, wherein at least one of a gear step change is avoided and the second and third time periods are set to zero if the amount of the lateral acceleration signal value exceeds a limit line which is at least one of a function of said first driving speed and variable with said first driving activity, or as long as, after the falling below the limit line, a fourth time period has not yet elapsed which is fixed or is variable with said first driving activity.

33. The method according to claim 32, wherein after expiration of the second, third and fourth time periods, an upshifting is only permitted again in the drive operation and after the expiration of a fifth time period which is a function of the driving activity.

34. The method according to claim 1, wherein a drive operation is recognized if the throttle valve signal value is larger than an engine rotational speed dependent characteristic limit line, and the time variation of the driving speed signal value assumes positive values after that time.

35. The method according to claim 34, wherein prevention of the upshifting is permitted only if a differential speed between a speed of a nonpowered axle and the driving speed detected at a powered axle does not exceed a permissible differential speed value.

36. The method according to claim 35, further including the step, when the permissible differential speed value is exceeded, of opening, a converter lockup clutch of a transmission equipped with a torque converter, setting, a hold time during which an upshifting cannot be prevented, increasing by one the engaged gear step, and preventing backshifts, and setting back the opening-, setting-, increasing- and preventing-functions again when a drive operation is recognized and positive values of the change of the driving speed signal value exist.

37. The method according to claim 34, wherein an upshifting prevention is permitted only if the lateral acceleration signal value is larger than a second lateral acceleration limit value, the time variation of the throttle valve signal value is larger than a fourth throttle valve speed limit value, and the throttle valve signal value is smaller than a certain percentage of the engine-rotational-speed-dependent characteristic limit line.

38. A method for controlling automatically shifting transmission of a motor vehicle equipped with an internal combustion engine arranged to be influenced by a second time period depending on said first driving activity.

57. The method according to claim 56, wherein the second time period is set to zero during a braking operation of the motor vehicle, and after the termination of the braking operation, an upshifting during the drive operation is delayed by a third time period depending on said first driving activity.

58. The method according to claim 57, wherein at least one of a gear step change is avoided and the second and third time periods are set to zero if the amount of the lateral acceleration signal value exceeds a limit line which is at least one of a function of said first driving speed and variable with said first driving activity, or as long as, after the falling below the limit line, a fourth time period has not yet elapsed which is fixed or is variable with said first driving activity.

59. The method according to claim 58, wherein after expiration of the second, third and fourth time periods, an upshifting is only permitted again in the drive operation and after the expiration of a fifth time period which is a function of the driving activity.

60. The method according to claim 38, wherein a drive operation is recognized if the throttle valve signal value is larger than an engine rotational speed dependent characteristic limit line, and the time variation of the driving speed signal value assumes positive values after that time.

61. The method according to claim 60, wherein prevention of the upshifting is permitted only if a differential speed between a speed of a nonpowered axle and the driving speed detected at a powered axle does not exceed a permissible differential speed value.

62. The method according to claim 61, further including the step, when the permissible differential speed value is exceeded, of opening, a converter lockup clutch of a transmission equipped with a torque converter, setting, a hold time during which an upshifting cannot be prevented, increasing by one the engaged gear step, and preventing backshifts, and setting back the opening, setting, increasing and preventing functions again when a drive operation is recognized and positive values of the change of the driving speed signal value exist.

63. The method according to claim 60, wherein an upshifting prevention is permitted only if the lateral acceleration signal value is larger than a second lateral acceleration limit value, the time variation of the throttle value signal value is larger than a fourth throttle valve speed limit value, and the throttle valve signal value is smaller than a certain percentage of the engine-rotational-speed-dependent characteristic limit line.

64. An apparatus for controlling an automatically shifting transmission of a motor vehicle equipped with an internal combustion engine controllable by a power control element constituted by one of an accelerator pedal and a throttle valve, comprising an electrohydraulic transmission control system, having shifting program modules, a microprocessor for detecting signals of at least one engine rotational speed sensor and a throttle valve sensor and, by way of the detected signals and the shifting program modules, for generating gear step change signals for controlling electrohydraulic gear step change valves, a driving speed sensor, a lateral acceleration sensor and a longitudinal acceleration sensor are operatively connected to the transmission control system, means for fitting the input signals with low-pass characteristic diagram modules for converting the filtered input signal into primary parameter values, a linking-function module for determining from the primary parameter values a secondary parameter, a digital filter with a low-pass characteristic converting the secondary parameter into a driving activity, and an additional characteristic diagram module from which one of several shifting programs is selected, wherein gear steps of the transmission are automatically shifted by shifting programs as a function of at least a position a throttle valve and of an engine rotational speed by sensing a throttle valve signal proportional to the position of the throttle valve, and to obtain a change-over strategy between the shifting programs, using the sensed throttle valve signal value and at least one additional sensed parameter from a group of parameters comprising a driving speed signal value corresponding to a driving speed, a lateral acceleration signal value corresponding to a lateral acceleration, a longitudinal acceleration signal value corresponding to a longitudinal acceleration, a longitudinal deceleration signal value corresponding to a longitudinal deceleration, and an engine rotational speed signal value corresponding to the engine rotational sped, converting the sensed parameters with at least one of five characteristic diagrams to primary parameter values, obtaining from a linking function, a secondary parameter value, determining and storing a first driving activity from a weighted sum of the obtained secondary parameter value and a value of a previously determined first driving activity in a first calculating period, and using the first driving activity for selection of one of a desired shifting program and a targeted changing of shifting decisions.

65. An apparatus for controlling an automatically shifting transmission of a motor vehicle equipped with an internal combustion engine controllable by one of an accelerator pedal and a throttle valve constituting a power control element, comprising an electrohydraulic transmission control system having shifting program modules, a microprocessor for detecting signals of at least one engine rotational speed sensor and a throttle valve sensor and, by way of the detected signals and the shifting program modules, for generating gear step change signals for controlling electrohydraulic gear step change valves, a driving speed sensor, a lateral acceleration sensor and a longitudinal acceleration sensor are operatively connected to the transmission control system, means for fitting the input signals with low-pass characteristic diagram modules for converting the filtered input signal into primary parameter values, a linking-function module for determining from the primary parameter values a secondary parameter, a digital filter with a low-pass characteristic converting the secondary parameter into a driving activity, and an additional characteristic diagram module operatively arranged from which one shifting program of several shifting programs is selected, wherein gear steps of the transmission are automatically shifted by shifting programs as a function of at least a position a throttle valve and of an engine rotational speed, by sensing a throttle valve signal proportional to the position of the throttle valve, using to obtain a change-over strategy between the shifting programs the senses throttle valve signal value for obtaining a change-over strategy between driving programs and at least one additional sensed parameter from a group of parameters comprising a driving speed signal value corresponding to a driving speed, a lateral acceleration signal value corresponding to a lateral acceleration, a longitudinal acceleration power control element constituted by one of an accelerator pedal and a throttle valve, comprising the steps of
   a. automatically shifting gear steps of the transmission by shifting programs as a function of at least a position of a throttle valve and an engine rotational speed,
   b. sensing a throttle valve signal proportional to the position of the throttle valve,
   c. using to obtain a change-over strategy between the shifting programs the sensed throttle valve signal value for obtaining a change-over strategy between driving programs and at least one additional sensed parameter from a group of parameters comprising a driving speed signal value corresponding to a driving speed, a lateral acceleration signal value corresponding to a lateral acceleration, a longitudinal acceleration signal value corresponding to a longitudinal acceleration, a longitudinal deceleration signal value corresponding to a longitudinal deceleration, and an engine rotational speed signal value corresponding to the engine rotational speed,
   d. converting the sensed parameters with at lest one of five characteristic diagrams to primary parameters values for use in a linking function,
   e. obtaining from the linking function, a secondary parameter value,
   f. storing the obtained secondary parameter value,
   g. updating, with each newly obtained secondary parameter value, a number of previously obtained and stored secondary parameter values,
   h. determining with weighting and formation of sums a first driving activity from stored values of the secondary parameter, and
   i. using the first driving activity for one of the selection of one of the shifting programs and a targeted changing of shifting decisions in the automatic shifting of the transmission of the motor vehicle.

39. The method according to claim 38 wherein the step of selection of the shifting program from the first driving activity occurs with a sixth characteristic diagram, from a number of shifting programs including a consumption-optimized shifting program and a power-optimized shifting program, wherein additional power-optimized shifting programs are selected with increasing values of the first driving activity.

40. The method according to claim 39, wherein the power-optimized shifting program is selected if the time variation of the throttle valve signal value is larger than a second throttle valve speed limit value, and a return takes place to the previously selected shifting program if the throttle valve signal value is taken back by a fixed value of a value which is variable with the driving activity and a fixed part of the achieved maximal throttle valve signal value.

41. The method according to claim 39, wherein, if a speed of change of the throttle valve signal value exceeds a first limit valve which is one of fixed and variable with the driving activity, at least one next higher, more power-oriented shifting program is selected at least until the power-optimized shifting program is reached.

42. The method according to claim 38, wherein the linking function is a maximal value selection from the primary parameters.

43. The method according to claim 38, wherein a second characteristic diagram of the five characteristic curves assigns larger values of the second primary parameter to values of the engine rotational speed signal value which increase by a rising curve.

44. The method according to claim 43, wherein the rise of the curve is a function of the gear step and decreases with an increasing gear step.

45. The method according to claim 38, wherein a third characteristic diagram of the five characteristic diagrams assigns larger vales of the third primary parameter to values of the lateral acceleration signal value which increase by a rising curve.

46. The method according to claim 38, wherein a fourth characteristic diagram of the five characteristic diagram assigns larger values of the fourth primary parameter to values of the longitudinal acceleration signal value which increase by a rising curve.

47. The method according to claim 46, wherein the rise of the rising curve is a function of the speed and increases with increasing signal values of sensed driving speed.

48. The method according to claim 38, wherein a fifth characteristic diagram of the five characteristic diagrams assigns larger values of the fifth primary parameter to values of the longitudinal deceleration signal value which increase by a rising curve.

49. The method according to claim 48, wherein the rise of the rising curve is a function of the speed and increases with increasing driving speed signal values.

50. The method according to claim 38, wherein the selection of the shifting program takes place by way of the sixth characteristic diagram from an overall driving activity composed of the first driving activity and of a second driving activity.

51. The method according to claim 50, wherein the second driving activity is determined from a weighted sum of a newly obtained intermediate quantity and a value of a second driving activity previously determined in a first calculating period and stored.

52. The method according to claim 51, wherein the intermediate quantity is determined from a weighted sum of a quotient of a longitudinal acceleration signal value and a maximal vehicle acceleration which is a function of the gear, of a quotient of a longitudinal deceleration signal value and of a maximal vehicle deceleration which is a function of the gear, and the lateral acceleration signal value divided by a maximal vehicle lateral acceleration.

53. The method according to claim 51, wherein in a first determination of the values of the first and the second driving activity, the values are set to an initial value.

54. The method according to claim 38, further including the steps of locking later after shifting operation and opening earlier before shifting operative a converter lockup clutch of a transmission equipped with a torque converter with increasing values of the driving activity, after shifting operations, and opening the clutch earlier or holding the clutch locked only at higher engine rotational speed signal values.

55. The method according to claim 38, further including the step, when the accelerator pedal is stepped down completely of selecting and actuating a kick-down shifting program until the throttle valve signal value falls below a second limit value which is one of fixed and variable with said first driving activity.

56. The method according to claim 55, wherein an upshift during the drive operation is delayed by a second time period if a speed of change of the throttle valve signal value falls below a third limit value, the signal value corresponding to a longitudinal acceleration, a longitudinal deceleration signal value corresponding to a longitudinal deceleration, and an engine rotational speed signal value corresponding to the engine rotational speed, converting the sensed parameters with at least one of five characteristic diagrams to primary parameter values, obtaining from a linking function, a secondary parameter value, storing the obtained secondary parameter value, updating, with each newly obtained secondary parameter values, determining with weighting and formation of sums a first driving activity from a stored values of the second parameter, and using the first driving activity for the selection of one of a shifting program and a targeted changing of shifting decisions.

* * * * *